United States Patent [19]

Torres

[11] Patent Number: 5,025,050

[45] Date of Patent: Jun. 18, 1991

[54] ULTRAVIOLET-RADIATION STABILIZER AND FLAME RETARDANT SYSTEMS

[75] Inventor: James E. Torres, Baton Rouge, La.

[73] Assignee: Ethyl Corporation, Richmond, Va.

[21] Appl. No.: 494,398

[22] Filed: Mar. 16, 1990

[51] Int. Cl.$^5$ ............... C08K 5/3435; C08K 5/3492; C08K 5/521

[52] U.S. Cl. ........................... 524/91; 524/94; 524/127; 524/401; 524/436; 252/400.23; 252/403; 252/397

[58] Field of Search ............... 252/400.23, 403, 397; 524/91, 94, 127, 401, 436, 99, 102

[56] References Cited

U.S. PATENT DOCUMENTS

| | | | |
|---|---|---|---|
| T943,009 | 2/1976 | Smith et al. | 524/91 |
| 3,368,997 | 2/1968 | Gordon | 524/91 |
| 3,624,024 | 11/1971 | Caldwell et al. | 524/281 |
| 3,900,442 | 8/1975 | Zannucci et al. | 524/91 |
| 3,901,848 | 8/1975 | Dibattista et al. | 524/91 |
| 3,935,163 | 1/1976 | Spivack et al. | 524/91 |
| 3,981,856 | 9/1976 | Hudgin et al. | 524/91 |
| 4,080,404 | 3/1978 | Deets | 524/371 |
| 4,087,402 | 5/1978 | Monte et al. | 524/127 |
| 4,173,561 | 11/1979 | Tabana et al. | 524/91 |
| 4,226,999 | 10/1980 | Malherbe et al. | 546/222 |
| 4,374,220 | 2/1983 | Sonnenberg | 524/94 |
| 4,417,009 | 11/1983 | Sugarman et al. | 524/127 |
| 4,467,062 | 8/1984 | Hornbaker et al. | 524/89 |
| 4,535,102 | 8/1985 | Kusumoto et al. | 524/127 |
| 4,535,170 | 8/1985 | Sonnenberg | 548/462 |
| 4,546,126 | 10/1985 | Breitenfellner et al. | 523/216 |
| 4,581,396 | 4/1986 | Sonnenberg | 524/87 |
| 4,590,221 | 5/1986 | Kuhnel et al. | 524/91 |
| 4,925,888 | 5/1990 | Aumueller et al. | 524/91 |

FOREIGN PATENT DOCUMENTS 2011915 12/1978 United Kingdom .

OTHER PUBLICATIONS

Kirk–Othmer, Encyclopedia of Chemical Technology, 3rd edition, vol. 23, pp. 615–627, copyright 1983, John Wiley & Sons, Inc.

*Primary Examiner*—Kriellion Morgan
*Attorney, Agent, or Firm*—E. E. Spielman, Jr.; David E. LaRose

[57] ABSTRACT

This invention relates to an ultraviolet-radiation stabilizer flame retarding system containing an N,N'-ethylene-bis(tetrabromophthalimide) or an N,N'-bis(tetrabromophthalimide) predominate product, a hindered-amine light stabilizer, a 2-(2'-hydroxyphenyl)benzotriazole, a titanate, and, optionally, Mg(OH)$_2$ and/or ZnO.

8 Claims, No Drawings

ULTRAVIOLET-RADIATION STABILIZER AND FLAME RETARDANT SYSTEMS

BACKGROUND OF THE INVENTION

This invention relates to an economical ultraviolet-radiation stabilizer and flame retardant system for use in acrylonitrile-butadiene-styrene based thermoplastic formulations.

It is well recognized in the thermoplastic art that acrylonitrile-butadiene-styrene copolymers (ABS) are sensitive to UV radiation, which radiation is a component of sunlight and some artificial lighting. When ABS is combined with brominated aryl or cycloalkyl flame retardants in thermoplastic formulations, articles made from such formulations are especially sensitive to UV radiation. Sensitivity to UV radiation can be evidenced by discoloration and/or embrittlement of the articles.

The art has approached this problem from two directions. The most basic approach is to mask the discoloration of the article by loading the thermoplastic formulation with white pigment, e.g. ZnO, ZnS, $TiO_2$, or $CaCO_3$. To be effective, these loadings are substantial, say about 3 to 10 weight percent based upon the total weight of the thermoplastic formulation. While apparent color degradation is diminished, the use of the pigment at the needed loadings can adversely effect the article's properties.

The second approach does not rely on masking color degradation, but rather attempts to render the UV radiation impotent in its color degrading and/or embrittlement effect. This is accomplished by incorporating UV absorbers, excited state quenchers, or a mixture thereof in the thermoplastic formulation. Exemplary of compounds which have good UV absorption qualities are the 2-hydroxybenzophenones and the 2-(2'-hydroxyphenyl) benzotriazoles. Excited-state quenchers are exemplified by hindered-amine light stabilizers and certain nickel chelates. While the use of UV absorbers and excited-state quenchers are efficacious, the high cost of these materials argues for a reduction in the amount of such materials needed to achieve the effect sought.

An economical UV stabilizer system has been found which features reduced amounts of UV absorber, etc. in the system. The system contains 0.1 weight percent to 1.0 weight percent hindered-amine light stabilizer (HALS), 0.25 weight percent to 1.5 weight percent of a UV absorber, i.e., a 2-(2'-hydroxy-phenyl) benzotriazole (HPBT), and a synergistic amount of ZnO and/or $Mg(OH)_2$. While such a system gives good UV stability, there is, as always, room for improvement.

THE INVENTION

This invention relates to a very effective and economical ultraviolet-radiation stabilizer and flame retardant system for use in ABS-based thermoplastic formulations. The system comprises: (a) a flame retardant amount of a product which is predominate in N,N'-ethylene-bis (tetrabromophthalimide) or N,N'-bis(tetrabromophthalimide), which product is characterized by having a Yellowness Index (ASTM E313) no greater than about 16 after being exposed to oven-aging at a temperature of from about 210° C. to about 230° C. for about 6 hours; (b) a hindered-amine light stabilizer (HALS); (c) a 2-(2'-hydroxy-phenyl)benzotriazole (HPBT); (d) a titanate selected from,

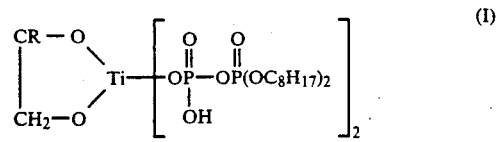

wherein R=($^-$H)$_2$ or =O; a methacrylate functional amine adduct of (I) when R=($^-$H)$_2$, an acrylate functional amine adduct of,

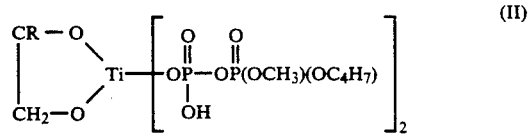

and mixtures of two or more of the foregoing, and, optionally, (e) $Mg(OH)_2$ and/or ZnO.

Also, this invention relates to ABS-based thermoplastic formulations and articles which contain such ultraviolet-radiation stabilizer and flame retardant systems.

For the purposes of this invention the UV stabilizing effect of the subject systems is indicated by the $\Delta E_{48}$ values which are obtained by placing a test plaque made from a thermoplastic formulation of this invention in a Sunlighter 150 from Test-Lab Apparatus Company for a period of 48 hours. The bulbs used in the Sunlighter 150 are from George W. Gates and Company and are designated as RS-4/G (100 watts). Before and after the 48-hour period the L, a and b Hunter color values are determined with a Lab Scan II from Hunter Associates Laboratory. The $\Delta E_{48}$ values are then calculated from the formula:

$$\Delta E_{48} = \sqrt{\Delta L^2 + \Delta a^2 + \Delta b^2}$$

$\Delta L = L_{initial} - L_{final}$,
$\Delta a = a_{initial} - a_{final}$, and
$\Delta b = b_{initial} - b_{final}$ The N,N'-ethylene-bis(tetrabromophthalimide) predominate product can be obtained as Saytex® BT-93W® from Ethyl Corporation. The N,N'-bis (tetrabromophthalimide) predominate product can be produced by reacting tetrabromophthalic anhydride with hydrazine sulfate in concentrated sulfuric acid. The hydrazine sulfate is used in a 20 percent to 30 percent excess of the stoichiometric requirement of 1 mole of hydrazine sulfate per mole of anhydride. The term "predominate product" means that the product contains at least 98 weight percent N,N'-ethylene-bis-tetrabromophthalimide or at least 90 weight percent and preferably at least 92 weight percent N,N'-bis(tetrabromophthalimide). The Yellowness Index (Y.I.) value used in characterizing the bisimide product is obtained after the product has undergone oven-aging. The oven-aging is not a treatment of the product but rather is a method for thermally stressing the product to predict its tendency to undergo color change when exposed to processing, e.g. injection molding, compression molding, conditions. If the product is sensitive to thermal stirring it will take on a yellowish tint which will give a Y.I. value above 16 typically above 20. If the Y.I. value, after processing, is much above 16, then that product is not preferred for use in formulations which will be molded to form while or lightly colored articles as the yellow color of the bisimide product will deleteriously color the article.

When comparing $\Delta E_{48}$ values to determine the effectiveness of a system of the invention, it is important to use bisimide products which have substantially the same Y.I. values as the $\Delta E_{48}$ values can be skewed in favor of articles having more initial color even though the more colored article has the same or greater UV sensitivity than does a less-colored article. In fact, a very white article is liable to show a greater color change, and thus a greater $\Delta E_{48}$, than a colored article even should the former have less UV sensitivity than the latter.

The HALS used in the ultraviolet-radiation and flame retardant systems of this invention are well known. See *Kirk-Othmer Encyclopedia of Chemical Technology* (3rd edition), Vol. 23, pages 620–624 (1981). Preferred HALS are those having the formula ABA or

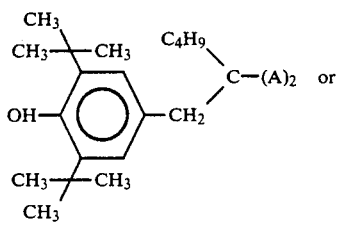

a mixture of such compounds. A, as used above, is the monovalent radical,

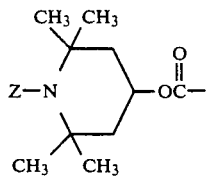

in which Z is, for each A, independently selected from H and —CH$_3$. B, as used above, represents —(CH$_2$)$_n$, in which n is a whole integer and in which $2 \leq n \leq 10$.

Preferred HALS are,

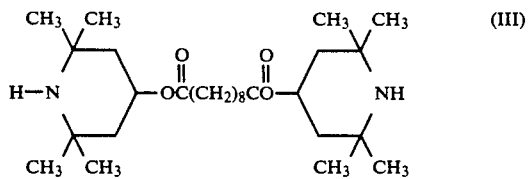

and

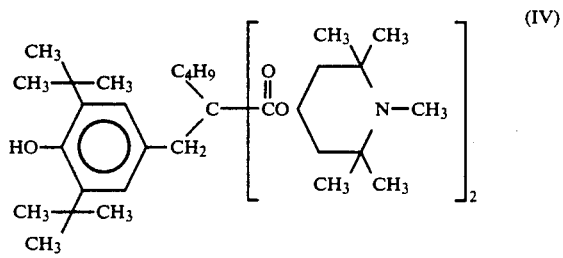

Compound III is sold by Ciba-Geigy Corporation under the tradename Tinuvin ® 770 while compound IV is sold by Ciba-Geigy Corporation under the tradename Tinuvin ® 144.

The HPBT's useful in the systems of this invention are well known to the prior art. See *Kirk-Othmer Encyclopedia of Chemical Technology* (3rd Edition), Vol. 23, pages 615–627 (1981). The preferred HPBT's are the commercially available ones, e.g.

2-(2'-hydroxy-5-methylphenyl) benzotriazole (Tinuvin ® P, Ciba-Geigy Corporation)
2-(2'-hydroxy-5'-t-octylphenyl) benzotriazole (Cyasorb ® UV 5411, American Cyanimid Company)
2-[2'-hydroxy-3',5'-(di-t-butyl)phenyl]benzotriazole (Tinuvin ® 320, Ciba-Geigy Corporation)
2-[2'-hydroxy-3',5'-(di-t-amyl)phenyl]benzotriazole (Tinuvin ® 328, Ciba-Geigy Corporation)
2-[2'-hydroxy-3',5'-di-(α,α-dimethylbenzyl)phenyl]benzotriazole (Tinuvin ® 900, Ciba-Geigy Corporation)
2(3'-t-butyl-2'-hydroxy-5'-methylphenyl)-5-chlorobenzotriazole (Tinuvin ® 326, Ciba-Geigy Corporation)
2(2'-hydroxy-3',5'-di-t-butyl)-5-chlorobenzotriazole (Tinuvin ® 327, Ciba-Geigy Corporation)

The most preferred HPBT is 2-(3'-t-butyl-2'-hydroxy-5'-methylphenyl)-5-chlorobenzotriazole.

The Mg(OH)$_2$ and/or ZnO are best provided in powder form to facilitate homogenous distribution in the formulation.

The titanates used in the systems of the invention are generally referred to in the art as chelate titanate coupling agents, i.e. (I) type compounds, or as quat titanate coupling agents, e.g. the before-described amine adducts. Exemplary of the former are di(dioctyl)pyrophosphate oxoethylene titanate and di(dioctyl)pyrophosphate ethylene titanate, both of which can be purchased from Kenrich Petrochemicals, Inc. of Bagonne, New Jersey under the tradenames, respectively, KR 138S and KR 238S. The quat titanate coupling agents are commercially available from the same source. Exemplary of such quats are the methacrylamide functional amine adducts of (I), when R=($^-$H)$_2$, and the acrylate functional amine adducts of (II), the former adduct being sold under the tradename KR 238J and the latter under the tradename KR 262A1.

The amount of ultraviolet-radiation stabilizer and flame retardant system used in the ABS-based thermoplastic formulation should provide: a flame retardant amount of the N,N'-ethylene-bis(tetrabromophthalimide) or N,N'-bis(tetrabromophthalimide) predominate product; optionally, from about 0.125 weight percent to about 1.0 weight percent Mg(OH)$_2$ and/or ZnO; from about 0.1 weight percent to about 1.0 weight percent HALS; from about 0.25 weight percent to about 1.5 weight percent HPBT; and from about 0.1 weight percent to about 0.5 weight percent titanate, all based upon the total weight of the formulation. Preferred amounts are from about 0.25 weight percent to about 0.50 weight percent metal oxide, from about 0.125 weight percent to about 0.50 weight percent HALS from about 0.5 weight percent to about 1.25 weight percent HPBT and from about 0.15 weight percent to about 0.35 weight percent titanate.

The flame retardant amount of N,N'-ethylene-bis(tetrabromophthalimide) or N,N'-bis(tetrabromophthalimide) predominate product used is empirically determined and dependent upon the presence or absence in the ABS-based thermoplastic formulation of a flame retardant synergist, e.g. antimony oxides. These synergists are well known and are conventionally used in combination with most brominated flame retardants as their use enables a reduction in the amount of flame retardant needed to achieve the flame retardant effect sought. When a synergist is used and a UL-94 V-0 rating is sought, the bisimide predominate product used is in an amount from about 14 weight percent to about 20 weight percent and, preferably, from about 16 weight percent to about 19 weight percent, all based upon the total weight of the ABS-based thermoplastic formulation. On this same basis, the amount of synergist used is within the range of from about 2.0 weight percent to about 4 weight percent.

The systems of this invention can be incorporated into the thermoplastic formulation as a total product or as individual components of each system. Incorporation can be effected by conventional mixing or blending techniques, for example by use of a Banbury mixer. The order of incorporation is not critical. It is preferred to incorporate the system as a total product into the formulation. To insure homogeneity of the components in the system, it is preferred to form a solution of the titanate and a solvent, e.g. acetone, alcohol, etc., and to form a stirred mixture of this solution and the other components of the system. The solvent is then removed, for example by evaporation, from the mixture leaving a highly homogenous system.

The ABS component of the thermoplastic formulation of the present invention may have units other than ABS present in the polymer. For example, a combination of acrylonitrile-butadiene-styrene with methyl-methacrylate copolymerized therein can be used. Typical polymers used to modify the ABS include modified styrene resins such as rubber modified polystyrenes, and the styrene containing copolymers such as the styrene-acrylonitrile copolymers, styrene-butadiene copolymers, styrene-acrylonitrile-α-alkyl styrene copolymers, poly-methylstyrene, copolymers of ethylvinylbenzene and divinylbenzene, and the like. Preferred is unmodified acrylonitrile-butadiene-styrene.

The ABS-based thermoplastic formulations will generally contain from 50 weight percent to about 90 weight percent ABS, based upon the total weight of the thermoplastic formulation.

The thermoplastic formulations containing the systems of this invention can additionally contain other conventional additives, e.g. fillers, plasticizers, antistatic agents, coloring agents, etc. When the thermoplastic formulation contains a coloring agent the degradation due to ultraviolet light or radiation can be masked and thus, the $\Delta E_{48}$ values of the colored thermoplastic formulations are not necessarily reliable as a measure of UV degradation.

To promote high dispersibility of the ultraviolet-stabilizer flame retardant system in an ABS-based thermoplastic formulation, and to enhance the formulation's impact strength, it has been found desirable to include in the formulation certain additive combinations. A particularly useful additive combination includes a metal fatty acid salt/amide (1 weight percent) and a chlorinated polyethylene resin (5.0 weight percent). Another useful combination includes a metal fatty acid salt/amide (1.0 weight percent), powdered acrylonitrile-butadiene rubber (1.0 weight percent) and a polysiloxane surfactant (1.0 weight percent). The foregoing can be commercially obtained as follows: the metal fatty acid salt/amide from Structol Company of America under the tradename Structol TR-016, the chlorinated polyethylene resin from Dow Chemical Company under the tradename TYRIN-3615; the powdered acrylo-nitrile-butadiene rubber from Goodyear Tire & Rubber Company under the tradename HP715-CL, and the polysiloxane surfactant from Air Products & Chemicals, Inc. under the tradename XF-B41-57.

Conventional techniques such as injection molding, compression molding and extrusion can be used to produce articles from the ABS-based thermoplastic formulations of this invention.

The following Examples illustrate the principles of this invention and are not to be taken as being limiting.

EXAMPLE I

A thermoplastic formulation was prepared by mixing, in a Banbury mixer, at a temperature of 180° C., (a) 787 grams of Cycolac ® T-1000 (Natural) ABS from Borg-Warner Corporation, (b) 165 grams of Saytex ® BT-93W ® flame retardant, (c) 30 grams of $Sb_2O_3$, (d) 10 grams Tinuvin ® 326 (Ciba-Geigy Corporation), (e) 2.5 grams of Tinuvin ® 770 (Ciba-Geigy Corporation), (f) 2.5 grams of $Mg(OH)_2$, and (g) 3 grams of KR 238S (Kenrich Petrochemicals, Inc.). The mixed formulation was then run through a 90° C. heated roller mill. The milled material was cooled and pelletized. The pellets were then fed to a BSKM 100/40 HK Double Toggle injection molder to produce ⅛ inch thick test plaques. The temperature of the feed nozzle, mid zone and barrel were, respectively, 210° C., 220° C. and 226° C. The injection pressure was 1200 psi and the following pressure was 1800 psi. The test plaques were allowed to cool. One of the plaques was placed in the Sunlighter 150, previously described, for 48 hours. Before and after the 48 hours the Hunter color values of the plaque were obtained with a Lab Scan II. The Hunter color values were:

| Initial | | Final | | |
|---|---|---|---|---|
| L | = 85.67 | L | = | 85.65 |
| a | = −0.83 | a | = | −1.03 |
| b | = 12.52 | b | = | 13.17 |

The calculated $\Delta E_{48}$ value was 0.68. Y.I. initial was 21.45 and Y.I. final was 22.50.

EXAMPLE II

This Example is not of this invention and was run for comparative purposes. The same procedure of Example I was followed except that the thermoplastic formulation did not contain any KR 238S and contained 790 grams of Cycolac ® T-1000 (Natural) ABS. The $\Delta E_{48}$ value obtained was 1.20. The Hunter color values were:

| Initial | | Final | | |
|---|---|---|---|---|
| L | = 85.71 | L | = | 86.38 |
| a | = −0.45 | a | = | −1.07 |
| b | = 10.43 | b | = | 11.21 |

EXAMPLE III

The same procedure used in Example I was followed except that 3 grams of KR 138S (Kenrich Petrochemicals, Inc.) was used instead of 3 grams of KR 238S. The $\Delta E_{48}$ value was 0.53. The Hunter color values were:

| | Initial | | | Final | |
|---|---|---|---|---|---|
| L | = | 85.39 | L | = | 85.44 |
| a | = | −0.71 | a | = | −0.96 |
| b | = | 12.65 | b | = | −13.11 |

EXAMPLE IV

The same procedure used in Example II was followed except that 3 grams of KR 262A1 (Kenrich Petrochemicals, Inc.) were used instead of 3 grams of KR 238S. The $\Delta E_{48}$ value was 0.29. The Hunter color values were:

| | Initial | | | Final | |
|---|---|---|---|---|---|
| L | = | 85.27 | L | = | 85.31 |
| a | = | −0.95 | a | = | −0.95 |
| b | = | 13.88 | b | = | 13.60 |

EXAMPLE V

The same procedure was used as in Example I except that 3 grams of KR 238J (Kenrich Petrochemicals, Inc.) was used instead of 3 grams of KR 238S. The $\Delta E_{48}$ value was 0.50. The Hunter color values were:

| | Initial | | | Final | |
|---|---|---|---|---|---|
| L | = | 85.07 | L | = | 85.39 |
| a | = | −0.75 | a | = | −0.89 |
| b | = | 13.36 | b | = | 13.00 |

EXAMPLE VI

The procedure of Example V was repeated. The $\Delta E_{48}$ value was 0.65. The Hunter values were:

| | Initial | | | Final | |
|---|---|---|---|---|---|
| L | = | 84.83 | L | = | 84.30 |
| a | = | −0.91 | a | = | −0.55 |
| b | = | 14.34 | b | = | 14.41 |

EXAMPLE VII

This Example is a base line run. The procedure of Example I was followed except that only 805 grams of Cycolac® T-1000 (Natural) ABS, 165 grams of Saytex® BT-93W® flame retardant and 30 grams of Sb$_2$O$_3$ were used. No Tinuvin® 326, Tinuvin® 770, Mg(OH)$_2$ or KR 238S was used. The $\Delta E_{48}$ value 5.16. The Hunter color values were:

| | Initial | | | Final | |
|---|---|---|---|---|---|
| L | = | 83.24 | L | = | 80.56 |
| a | = | 0.25 | a | = | −0.07 |
| b | = | 8.93 | b | = | 13.13 |

EXAMPLE VIII

Preparation of N,N′-Bis(Tetrabromophthalimide)

Into a one-liter resin kettle was charged 481.0 of Saytex® RB-49 flame retardant (tetrabromophthalic anhydride) and 506 g of 96.7% sulfuric acid. The resultant solution was stirred with an overhead stirrer and heated to 100° C.

Into a 500 mL Erlenmeyer flask was charged 102.8 g hydrazine sulfate and 706 g of 96.7% sulfuric acid. The flask contents were heated and stirred until all of the hydrazine sulfate was dissolved.

The hydrazine sulfate solution was then added dropwise to the resin kettle with a polyethylene pipet over a period of sixty-five minutes to form a reaction mass.

The resulting reaction mass was stirred and heated to 180° C. for 14 hours. The reaction mass was allowed to cool and then subjected to vacuum filtration using a 3-liter funnel (90C glass frit) to remove the sulfuric acid. The filter cake was then scraped into a 4-liter beaker containing 3 liters of ice water. The mixture was stirred, allowed to settle, and decanted. The filter cake was returned to the 3-liter funnel, washed and filtered until the supernatant water had a neutral pH. The filter cake was then placed in a large crystallizing dish and dried at 100 C under vacuum for 24 hours to give 449.5 g of a white solid (94% yield) that had a melting point >500° C. Thermogravimetric Analysis was used to determine the purity of the solid as 95% N,N′-bis(tetrabromophthalimide).

What is claimed is:

1. An ultraviolet-radiation stabilizer and flame retardant system containing,
   (a) a flame retardant amount of an N,N′-ethylene-bis (tetrabromophthalimide) or N,N′-bis (tetrabromophthalmide) predominate product, which product is characterized by having a Y.I. (ASTM 1925) no greater than about 16 after being exposed to oven aging at a temperature of from about 210° C. to about 230° C. for about 6 hours;
   (b) a hindered-amine light stabilizer selected from a compound of the formula ABA or

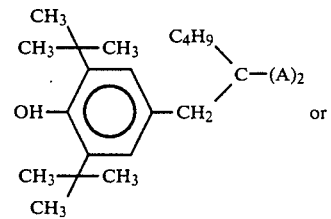

a mixture of such compounds, wherein A is

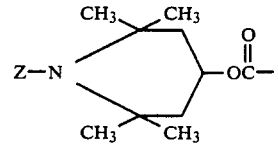

in which Z is, for each A, independently selected from H and —CH$_3$ and wherein B is —(CH$_2$)$_n$, with n being whole integer and with $2 \leq n \leq 10$;
   (c) a 2-(2′-hydroxyphenyl)benzotriazole;
   (d) a titanate selected from the group consisting of,

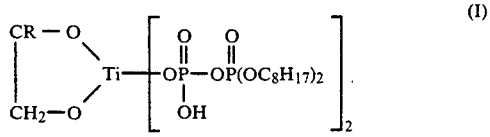 (I)

wherein R=(⁻H)₂ or =O;

a methacrylate functional amine adduct of (I) when R=(⁻H)₂, an acrylate functional amine adduct of,

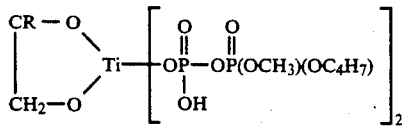

(II)

and mixture of two or more of the foregoing; and, (e) optionally, Mg(OH)₂ and or ZnO.

2. An ABS-based thermoplastic formulation comprising, (a) ABS;

(b) a flame retardant amount of an N,N'-ethylene-bis(tetrabromophthalimide) or N,N'-bis(tetrabromophthalimide) predominant product, which product is characterized by having a Y.I. (ASTM 1925) no greater than about 16 after being exposed to oven aging at a temperature of from about 210° C. to about 230° C. for about 6 hours;

(c) a hindered-amine light stabilizer selected from a compound of the formula ABA or

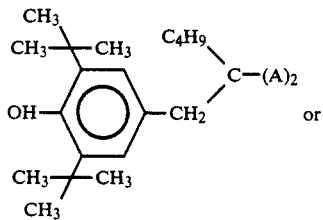

a mixture of such compounds, wherein A is

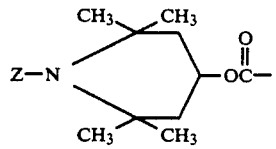

in which Z is, for each A, independently selected from H and —CH₃ and wherein B is —(CH₂)ₙ, with n being a whole integer and with 2≦n≦10;

(d) a 2-(2'-hydroxyphenyl)benzotriazole;

(e) a titanate selected from the group consisting of,

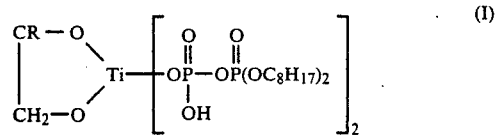

(I)

wherein R=(⁻H)₂ or =O;

a methacrylate functional amine adduct of (I) when R=(⁻H)₂, an acrylate functional amine adduct of,

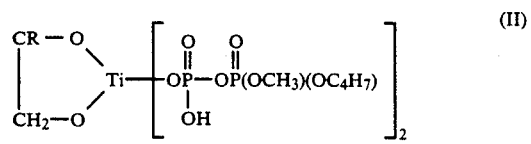

(II)

and mixtures of two or more of the foregoing; and, (f) optionally, Mg(OH)₂ and or ZnO.

3. The ultraviolet-radiation stabilizer and flame retarding system of claim 1 wherein said 2-(2'-hydroxyphenyl)-benzotriazole is selected from 2-(2'-hydroxy-5-methylphenyl)benzotriazole and 2-(3'-t-butyl-2-hydroxy-5'-methylphenyl)5-chlorobenzotriazole.

4. The ultraviolet-radiation stabilizer and flame retarding system of claim 1 wherein said 2-(2'-hydroxyphenyl)benzotriazole is selected from 2-(2'-hydroxy-5-methylphenyl)benzotriazole and 2-(3'-t-butyl-2-hydroxy-5'-methylphenyl)-5-chlorobenzotriazole.

5. The ultraviolet-radiation stabilizer and flame retarding system of claim 1 wherein the titanate is di(dioctyl)-pyrophosphate oxoethylene titanate, a methacrylamide functional amine adduct of di(dioctyl)pyrophosphate ethylene titanate, or a acrylate functional amine adduct of di(dioctyl)pyrophosphate ethylene titanate.

6. The ultraviolet-radiation stabilizer and flame retarding system of claim 4 wherein the titanate is di(dioctyl)pyrophosphate oxoethylene titanate, a methacrylamide functional amine adduct of di(dioctyl)pyrophosphate ethylene titanate, or a acrylate functional amine adduct of di(dioctyl)pyrophosphate ethylene titanate.

7. The ultraviolet-radiation stabilizer and flame retarding system of claim 4 wherein said hindered-amine light stabilizer is present in an amount within the range of from about 0.1 weight percent to about 1.0 weight percent, said 2-(2'-hydroxyphenyl)-benzotriazole is present in an amount within the range of from about 0.25 weight percent to about 1.5 weight percent, said Mg(OH)₂ and/or ZnO is present in an amount within the range of from about 0.125 weight percent to about 1.0 weight percent, and said titanate is present in an amount within the range of from about 0.1 weight percent to about 0.5 weight percent, all of said weight percent's being based upon the total weight of said ABS-based thermoplastic formulation.

8. An article made from the ABS-based thermoplastic formulation of claim 2.

* * * * *